(12) United States Patent
Chen et al.

(10) Patent No.: US 11,388,180 B2
(45) Date of Patent: *Jul. 12, 2022

(54) CONTAINER INTRUSION DETECTION AND PREVENTION SYSTEM

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,163

(22) Filed: Dec. 3, 2020

(65) Prior Publication Data

US 2021/0120019 A1 Apr. 22, 2021

Related U.S. Application Data

(63) Continuation of application No. 15/656,712, filed on Jul. 21, 2017, now Pat. No. 10,862,904.

(51) Int. Cl.
*H04L 9/40* (2022.01)
*G06F 9/455* (2018.01)

(52) U.S. Cl.
CPC ...... *H04L 63/1416* (2013.01); *G06F 9/45558* (2013.01); *G06F 2009/45579* (2013.01); *G06F 2009/45587* (2013.01); *H04L 63/0263* (2013.01); *H04L 63/20* (2013.01)

(58) Field of Classification Search
CPC . H04L 63/1416; H04L 63/0263; H04L 63/20; G06F 9/45558; G06F 2009/45579; G06F 2009/45587

USPC ........................................................ 726/23
See application file for complete search history.

(56) References Cited

U.S. PATENT DOCUMENTS

| | | | |
|---|---|---|---|
| 8,490,191 B2 | 7/2013 | Kuegler et al. | |
| 9,444,828 B2 | 9/2016 | Lee et al. | |
| 9,621,428 B1 | 4/2017 | Lev et al. | |
| 10,154,065 B1 | 12/2018 | Buehler et al. | |
| 2003/0074567 A1* | 4/2003 | Charbonneau | G06F 21/57 713/186 |
| 2016/0191546 A1 | 6/2016 | Spikes | |
| 2016/0191645 A1 | 6/2016 | Hayton et al. | |

(Continued)

OTHER PUBLICATIONS

Intrusion Prevention and Detection in Grid Computing—The ALICE case; Andres Gomez, Camilo Lara, Udo Kebschull for the ALICE Collaboration, Johann-Wolfgang-Goethe University, Frankfurt, Germany; Topscience, iopscience.iop.org; 21st International Conference on Computing in High Energy and Nuclear Physics (CHEP2015) 2015 (8 pages).

(Continued)

*Primary Examiner* — Michael S McNally
(74) *Attorney, Agent, or Firm* — K&L Gates LLP

(57) ABSTRACT

A container intrusion detection and prevention system includes a memory, a physical processor in communication with the memory, and an image scanner executing on the physical processor. The image scanner scans an image of a container in a container image registry. The container includes an application. The image scanner creates an image tag of the container and a set of generic rules for the container. The image scanner packages the image tag of the container with the set of generic rules to form a tuple and stores the tuple in an application rule registry.

20 Claims, 8 Drawing Sheets

(56) References Cited

U.S. PATENT DOCUMENTS

2017/0093918 A1 3/2017 Banerjee et al.
2017/0099197 A1 4/2017 Raney
2017/0116412 A1 4/2017 Stopel et al.
2017/0187750 A1 6/2017 Zhang et al.
2018/0285250 A1 10/2018 Helsley

OTHER PUBLICATIONS

Container Architecture for Detection and Prevention of Intrusions using virtualization technique; S. Saravanan, M. Ramakrishnan, M. Baskar, T. Gnanasekaran; Proc. of the Intl. Conf. on Advances in Computer Science and Electronics Engineering—CSEE 2013, pp. 100-104.
Container Based Intrusion Detection System in Multitier Web Applications; Nishigandha Shendkar; Department of Computer Engineering, Pune Institute of Computer Technology, Pune University, India; Dec. 2016; pp. 440-445.
Docker Container Security: Signed, Sealed and Delivered from Vulnerabililities; The New Stack; Nov. 16, 2015; pp. 1-5.

* cited by examiner

CONTAINER INTRUSION DETECTION AND PREVENTION SYSTEM

CROSS REFERENCES TO RELATED APPLICATIONS

The present application is a continuation of application Ser. No. 15/656,712 filed on Jul. 21, 2017, the entire content of which is hereby incorporated by reference herein.

BACKGROUND

The present disclosure generally relates to improving network security threat detection and prevention in cloud environments hosting containers. A multi-tenant cloud provider typically hosts many virtual machines ("VMs") belonging to many different tenants, which in turn host many different applications, including applications further virtualized in containers. Isolated guests such as VMs and containers may allow a programmer to quickly scale the deployment of applications to the volume of traffic requesting the applications. Isolated guests may be deployed in a variety of hardware environments. There may be economies of scale in deploying hardware in a large scale. A programmer may hire one or more cloud providers to provide contingent space for situations where the programmer's applications may require extra compute capacity, becoming a tenant of the cloud provider. A tenant may flexibly launch copies of isolated guests to scale their applications and services in response to the ebb and flow of traffic. Typically, a container is significantly lighter weight than a VM, and may be hosted in a VM, for example, in a container cluster, allowing for additional flexibility and scalability of deployment.

SUMMARY

The present disclosure provides a new and innovative system and methods to provide intrusion detection and prevention for containers. An example method includes scanning, by an image scanner, an image of a container in a container image registry. The container includes an application. The image scanner creates an image tag of the container and a set of generic rules for the container. Then, the image scanner packages the image tag of the container with the set of generic rules to form a tuple and stores the tuple in an application rule registry.

Additional features and advantages of the disclosed method and apparatus are described in, and will be apparent from, the following Detailed Description and the Figures.

DETAILED DESCRIPTION OF EXAMPLE EMBODIMENTS

Figure 1:
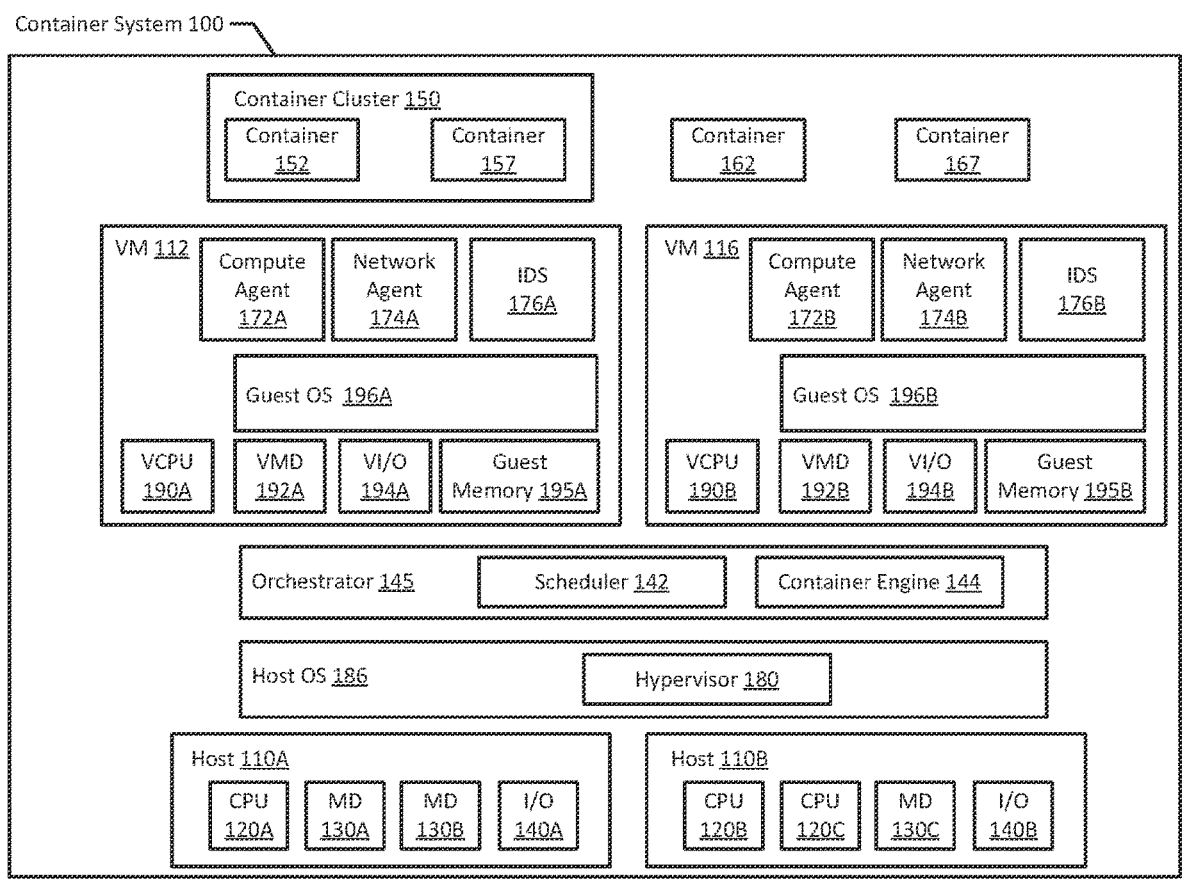
FIG. 1 is a block diagram of an example computer system according to an example of the present disclosure.

Described herein are methods and systems for providing intrusion detection and prevention for containers. Generally, providing network services inside containers (e.g., Linux® containers) in a multi-tenant environment may expose application vulnerabilities to other tenants in the container cluster. Although there are cluster-wide or cloud-wide firewall services provided by cloud service providers, these services may not have deep insight on the applications running inside the containers. That is, the firewall services provided by cloud service providers may not have information with respect to the types, versions, configurations, or dependencies of the applications. Thus, these services typically provide a relatively basic level of security protection services, for example, by merely opening or closing the service ports. However, merely securing the ports may not be sufficient to protect the containers from malicious attacks. For example, when a non-privileged application service in a container attempts to access a port reserved for a privileged service (e.g., ports 0 to 1024), cluster-wide or cloud-wide firewall services may not detect and/or prevent such malicious or abnormal access. One way to provide more security protection to container systems may be to use intrusion detection systems (IDSs) and/or intrusion prevention systems (IPSs). However, most IDSs and/or IPSs protect containers and container system based on rules, which are sensitive to application types, versions, configurations, or dependencies. Without such information, an IDS/IPS does not perform optimally. Accordingly, for optimal results, an image scanner scans each container to obtain information on application types, versions, configurations, or dependencies, so that IDS/IPS can effectively prevent and detect intrusion. However, the image scanning process (e.g. OpenSCAP) is time consuming, and slows down scaling processes, thereby defeating the purpose of flexible and quickly scaling deployment of services. Also, there are many different specific IDSs and/or IPSs available for use, and each may handle different application types, versions, configurations, and dependencies differently from one or more of the other IDSs/IPSs.

Aspects of the present disclosure may address the above-noted deficiencies. In an example, an image scanner may scan an image of a container for information about the application in the container such as application type, version, configuration, and/or dependency, and create generic rules customized for the container. Then, the image scanner may save a tuple of an image tag of the container and generic rules in an application registry. Then, a container host may retrieve the generic rules from the application registry. For example, when a compute agent in a container host tries to run a container using the image of the container, a network agent may pull the generic rules customized for the container based on the image tag, translate and/or convert the generic rules to IDS/IPS specific rules that are customized to the container, and run the IDS/IPS using the IDS/IPS specific rules.

In another example, the image scanner may create a signature for the container based on the information about the application (e.g., application type, version, configuration, and/or dependency) and save a tuple of an image tag of the container and a signature in the application registry. Then, the network agent may pull the signature for the container based on the image tag, translate and/or convert the signature to IDS/IPS specific rules, and run the IDS/IPS using the IDS/IPS specific rules.

In this way, aspects of the present disclosure may enable a system to use application information, such as application types, versions, configurations, and/or dependencies, and provide rules customized to each container or each application in the containers. Accordingly, aspects of the present disclosure may advantageously enable a container system to utilize an IDS/IPS, which typically operates based on rules sensitive to these kinds of application information, for containers with container/application customized rules created using the application information that is not typically available in conventional container systems, providing a more robust and optimized security protection system. Deploying vanilla IDS/IPS rules without customization as described herein fails to provide the same level of security protection as the present disclosure. Additional features and advantages of the disclosed method, system, and apparatus are described below.

FIG. 1 depicts a high-level component diagram of an example multi-processor computer system 100 in accordance with one or more aspects of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 140A-B). As used herein, physical processor or processors 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In an example, a processor may be a single core processor that is typically capable of executing one instruction at a time (or processing a single pipeline of instructions), or a multi-core processor that may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data. Processors (Central Processing Units "CPUs") 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 140A may be provided by one or more local buses of suitable architecture, for example, peripheral component interconnect (PCI).

In an example, hosts 110A-B may run one or more isolated guests, for example, containers 152, 157, 162, 167 and VMs 112 and 116. In an example, any of containers 152, 157, 162, and 167 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster (e.g., container cluster 150) that may be deployed together (e.g., in a Kubernetes® pod). In an example, a given service may require the deployment of multiple containers and/or pods in multiple physical locations. In an example, containers 152 and 157 may be part of container cluster 150, which may execute on VM 112. In an example, containers 162 and 167 may execute on VM 116. In an example, any of containers 152, 157, 162, and 167 may be executing directly on either of hosts 110A-B without a virtualized layer in between.

In an example, orchestrator 145 may be a container orchestrator such as Kubernetes® or Docker Swarm®, which may execute directly on host operating system ("OS") 186. In another example, orchestrator 145 along with subcomponents scheduler 142 (e.g., Kubernetes® scheduler) and/or container engine 144 (e.g., Docker® engine) may execute on a separate host system, for example across a network from hosts 110A-B. In an example, orchestrator 145, scheduler 142, and container engine 144 may be applications that schedule, launch, and/or manage isolated guests (e.g., containers 152, 157, 162, 167 and VMs 112 and 116). In an example, isolated guests may be further nested in other isolated guests. For example VM 112 may host a container cluster 150 including containers 152 and 157, while VM 116 may host containers 162 and 167.

System 100 may run one or more VMs (e.g., VMs 112 and 116) by executing a software layer (e.g., hypervisor 180) above the hardware and below the VMs 112 and 116, as schematically shown in FIG. 1. In an example, the hypervisor 180 may be a component of the host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to VMs 112, 116 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OS 186 without an intervening layer of virtualization.

In an example, VMs 112, 116 may be a virtual machine and may execute guest operating systems 196A-B, which may utilize the underlying VCPU 190A-B, VMD 192A-B, and VI/O 194A-B. One or more containers that may host isolated guests (e.g., containers 152, 157, 162, and 167) may be running on VMs 112, 116 under the respective guest operating systems 196A-B. Processor virtualization may be implemented by the hypervisor 180 scheduling time slots on one or more physical processors 120A-C such that from the guest operating system's perspective those time slots are scheduled on a virtual processor 190A-B.

VMs 112, 116 may run on any type of dependent, independent, compatible, and/or incompatible applications on the underlying hardware and host operating system 186. In an example, containers 152 and 157 running on VM 112 may be dependent on the underlying hardware and/or host operating system 186. In another example, containers 152 and 157 running on VM 112 may be independent of the underlying hardware and/or host operating system 186. In an example, containers 152 and 157 running on VM 112 may be compatible with the underlying hardware and/or host operating system 186. Additionally, containers 152 and 157 running on VM 112 may be incompatible with the underlying hardware and/or OS. The hypervisor 180 may manage memory for the host operating system 186 as well as memory allocated to the VMs 112, 116 and guest operating systems 196A-B such as guest memory 195A-B provided to guest OS 196A-B.

In an example, containers 162 and 167 may be individual containers (e.g., not part of a cluster) executing on VM 116. In an example, container engine 144 may be a component part of a container orchestrator 145. In other examples, container engine 144 may be a stand-alone component. Similarly, scheduler 142 may be a standalone component. In some examples, container engine 144, scheduler 142, and hosts 110A-B may reside over a network from each other, which may be, for example, a public network (e.g., the Internet), a private network (e.g., a local area network (LAN) or wide area network (WAN)), or a combination thereof.

In an example, each of VMs 112, 116 may include a compute agent 172A-B, a network agent 174A-B, and an intrusion detection system (IDS) 176A-B. The compute agents 172A-B, such as Kubelet in Kubernetes®, may be configured to start, stop, and manage containers 152, 157, 162, 167 in a container host. The compute agents 172A-B may be configured to pull a container image from a container image registry and execute the container using the container image. The network agents 174A-B, such as Kube-proxy in Kubernetes®, may be configured to run IDSs 176A-B to monitor and protect containers from network security threats. As used herein, IDS may refer to both an intrusion detection system and an intrusion prevention system. The IDSs 176A-B may be configured, when executed, to detect intrusions or intrusion attempts into the container system and provide appropriate measures to the intrusions, including preventing further intrusion. In an example, the IDS 176A may be a different type of IDS than IDS 176B.

Figure 2:
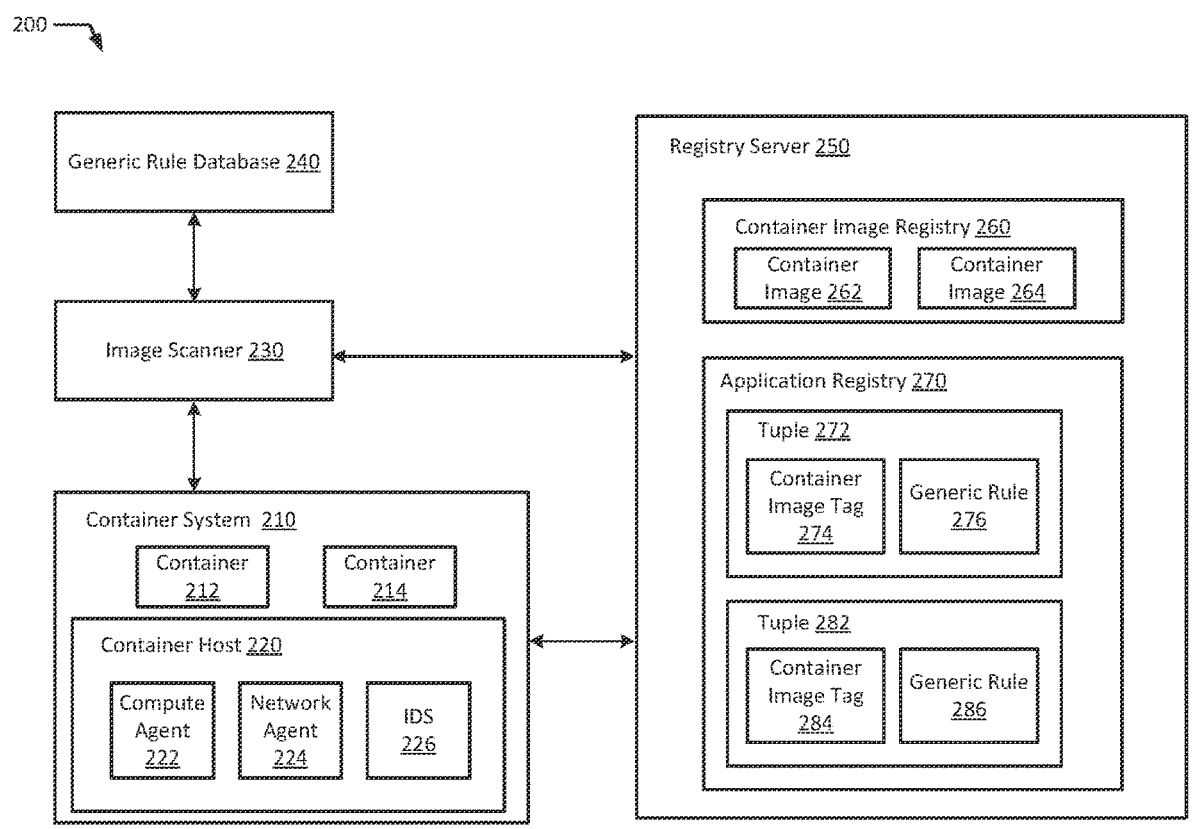
FIG. 2 is a block diagram of an example computer system according to another example of the present disclosure.

FIG. 2 shows a block diagram of an example system 200 according to an example of the present disclosure. The system 200 may include a container system 210. The container system 210 may include containers 212, 214 and a container host 220. The container host 220 may include a compute agent 222, a network agent 224, and an IDS 226. The compute agent 222 may be separate from the scheduler 142 or the container engine 144. For example, the container scheduler 142 may determine which container host will run which container or container image, and send a list of containers to run in each container host to each container host. Once the compute agent 222 in each container host 220 receives the list of containers 212, 214 to be executed in the container host 220, the compute agent 222 may interact with the container engine 144 to run the containers 212, 214 in the list as instructed by the container scheduler 142.

In an example, the IDS 226 may be configured to protect containers 212, 214 or applications in the containers 212, 214 running on the container host 220 from security attacks. In an example, the IDS 226 may include a rule engine configured to check the network traffic and packets against intrusion detection and prevention rules. In an example, the IDS 226 may include a rule database with intrusion detection and prevention rules, for example, in a format that is specific to the type of the IDS 226. In another example, the rule database may be located outside of the IDS 226.

The system 200 may also include an image scanner 230, such as OpenSCAP. The image scanner 230 may be configured to scan an image of a container having an application (e.g., microservice). The image scanner 230 may be able to identify the type, version, configuration, or dependency of the application inside the containers 212, 214. The image scanner 230 may be configured to generate information about the type, version, configuration (e.g., privileged user/service, non-privileged user/service), or dependency of the application and create generic rules customized to the application based on the information. The image scanner 230 may be a virtual or physical device that is separate from the container system 210 or the registry server 250.

Examples of the type of an application may include, but are not limited to, a database server, a webserver, a JAVA application, etc. Examples of the version of an application may include version numbers, such as v.1, v.2, and v.3. For example, a microservice for an online payment may be updated from version 1 (not using age information) to version 2 (using age information). In an example, dependency of the application may indicate the libraries on which the application is dependent. For example an application in container 212 may be dependent on C-library version 5, while another application in container 214 may be dependent on C-library version 6.

The system 200 may also include a generic rule database 240. The generic rule database 240 may include generic rules to monitor containers and container system for intrusion detection and prevention. The generic rule database 240 may include rules to detect malicious/abnormal patterns or traffic in the system. As used herein, a generic rule may refer to a general description of intrusion detection and prevention rules, for example, to monitor containers for security intrusion. In an example, the generic rule may be written in plain language (e.g., plain English) and not in a language or format specific to a particular type of IDS. In an example, the generic rule may need to be translated or converted to be used by an IDS. The following is a table showing an example generic rule compared with an example rule translated and/or converted for a specific IDS (e.g., Snort).

TABLE 1

| | |
|---|---|
| Generic Rule | Disable MySQL admin login |
| Translated Rule | alert tcp $EXTERNAL_NET any -> $SQL_SERVERS 3306 (msg:"MYSQL root login attempt"; flow:to_server,established; content:"\|0A 00 00 01 85 04 00 00 80\|root\|00\|"; classtype:protocol-command-decode; sid:1775; rev:2;) |

In an example, the generic rule may be a universal rule that can be used by all different types of IDSs. Therefore, the universal generic rules can be translated or converted to IDS specific rules for any type of IDS.

The system 200 may include a registry server 250. The registry server 250 may include a container image registry 260 and an application registry 270. The container image registry 260 may include container images 262, 264. For example, the container image 262 may be an image of container 212 and the container image 264 may be an image of container 214. In an example, the container images 262, 264 may be automatically created when a new container is created or an existing container or application is updated.

The application registry 270 may include multi-dimensional tuples 272, 282. Each of the tuples 272, 282 may be associated with a container image tag 274, 284 and a generic rule 276, 286. For example, it may be a tuple of {container image tag, generic rule}. The container image tags 274, 284 may include information about the name of the containers 212, 214 and/or the version (e.g., v.1, v.2, and v.3.) of the containers 212, 214 or the applications in the containers 212, 214. Therefore, the container image tags 274, 284 may indicate whether the containers 212, 214 or the applications in the containers 212, 214 are an updated version. In an example, the application registry 270 may be separate from the container image registry 260 as illustrated in FIG. 2. In an example, the application registry 270 may be located in a server separate from the registry server 250.

Figure 3:
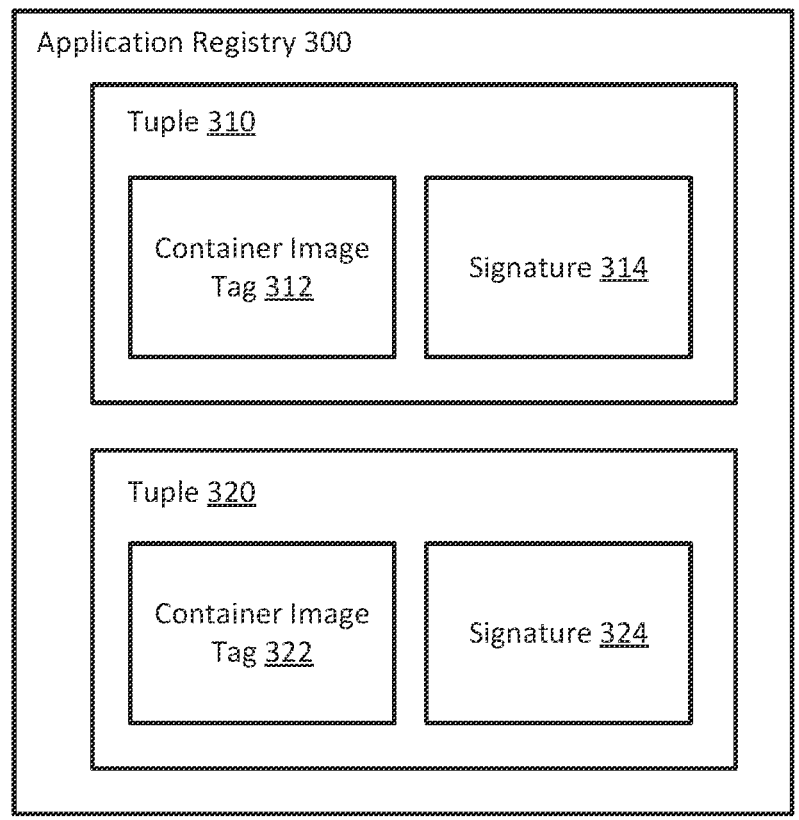
FIG. 3 is a block diagram of an example application registry according to an example of the present disclosure.

FIG. 3 shows a block diagram of an example application registry 300 according to another example of the present disclosure. The application registry 300 may include multi-dimensional tuples 310, 320. Each of the tuples 310, 320 may be associated with a container image tag 312, 322 and a signature 314, 324. For example, it may be a tuple of {container image tag, signature}. In an example, the tuples 272, 282, 310, 320 may include other information about the containers 152, 157, 162, 167, such as container images 262, 264. In an example, the tuples 272, 282, 310, 320 may not be limited to two-dimensions, and the tuples 272, 282, 310, 320 can have more dimensions (e.g., three dimensions, four dimensions, etc.). For example, it may be a tuple of {container image tag, signature, generic rule}.

The signatures 314, 324 may be a hash that is generated by a hash function. For example, the image scanner 230 may utilize a hashing function, such as MD5, SHA-128, SHA-256, or the like to generate a signature. Information about the containers 212, 214, such as type, version, configuration, or dependency of the application in the containers 212, 214, may be the inputs to one or more hash functions to populate the signatures 314, 324. In an example, the signatures 314, 324 may be an encrypted message including information about the nature of the application (e.g., type, version, configuration, or dependency). The network agent 224 may be able to select the right rules (e.g., generic rules or IDS specific rules) customized to the application/container based on the information in the signatures 314, 324, for example, by using the signatures 314, 324 to read from a database (e.g., a generic rule database 240 or an IDS specific rule database) generic rules or IDS specific rules. In case the network agent 224 selects generic rules from a generic rule database 240 based on the signature 314, 324, the network agent 224 may translate the generic rules into IDS specific rules based on the type of the IDS 226 before executing the IDS 226. In an example, the signatures 314, 324 may be an 8-bit or 16-bit number.

Figure 4:
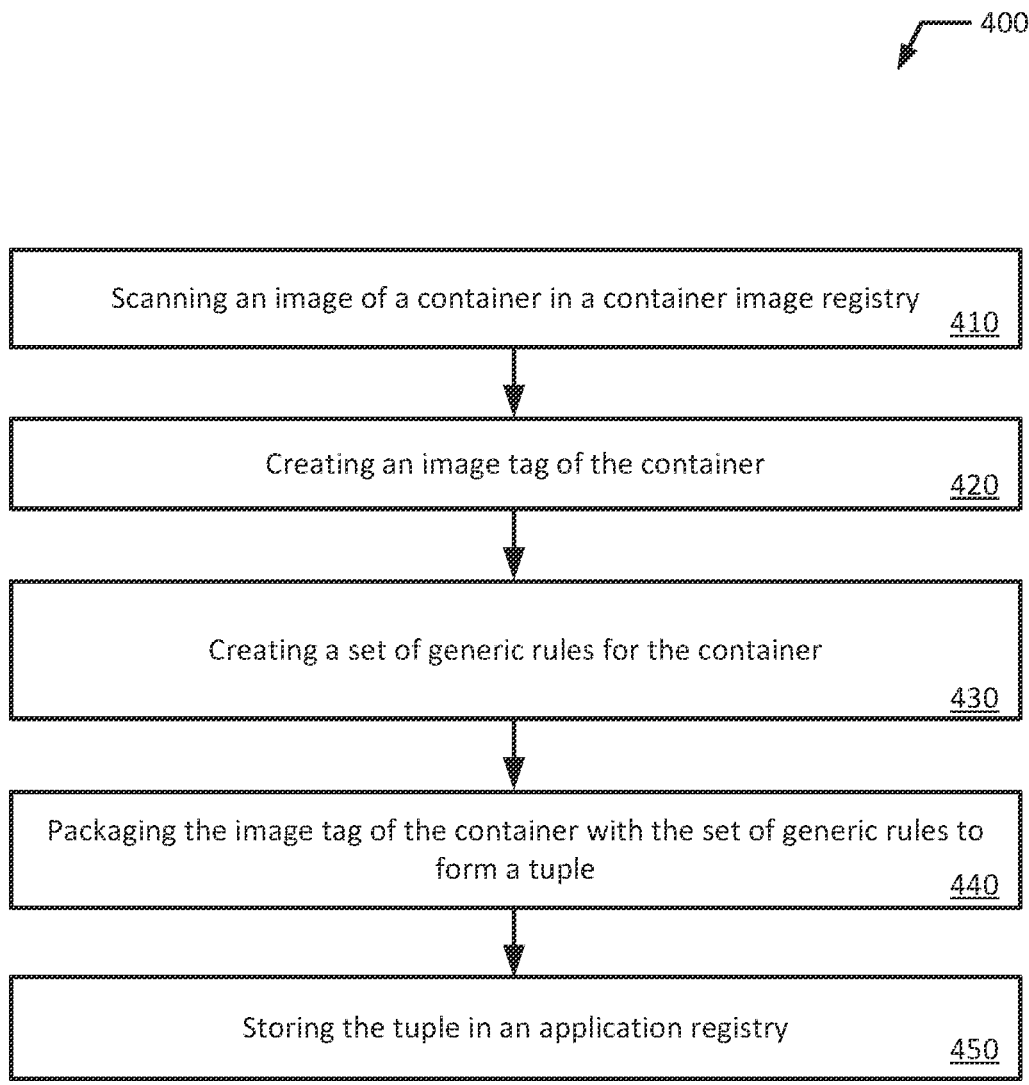
FIG. 4 is a flowchart illustrating an example process for providing intrusion detection and prevention for containers according to an example of the present disclosure.

FIG. 4 shows a flowchart illustrating an example process for providing intrusion detection and prevention for containers. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

In the illustrated example, an image scanner may scan an image of a container in a container image registry (block 410). For example, an image scanner 230 scans an image 262 of a container 162 in a container image registry 262. The container 162 may include an application, such as a microservice. The image scanner 230 may be able to generate information about the type, version, configuration, or dependency of the application and figure out potential vulnerabilities of the application based on the scanning. Then, the image scanner may create an image tag of the container (block 420). For example, the image scanner 230 creates an image tag 274 of the container 162.

The image scanner may create a set of generic rules for the container (block 430). For example, the image scanner 230 creates a set of generic rules 276 for the container 162 based on the information about the type, version, configuration, or dependency of the application. Then, the image scanner may package the image tag of the container with the set of generic rules to form a tuple (block 440). For example, the image scanner 230 packages the image tag 274 of the container 162 with the set of generic rules 276 to form a tuple 272. Then, the image scanner may store the tuple in an application rule registry (block 450). For example, the image scanner 230 stores the tuple 272 in an application rule registry 270.

The set of generic rules 276 may be customized to the container 162 to address the potential vulnerabilities of the application in the container 162. For example, as the versions, types, configurations, and/or dependencies of applications change, the intrusion detection and prevention rules (e.g., generic rules 276 or IDS specific rules) may need to be changed because the types of malicious attacks to which the container is vulnerable may be in part determined by the types, versions, configurations, or dependencies of applications it has. For example, rules for a privileged user may be different from the rules for a non-privileged user. Also, C-library itself may have some vulnerabilities and C-library version 5 and version 6 may be vulnerable to different types of malicious attacks. As a result, an application dependent on C-library version 5 may require intrusion detection and protection rules different from the application dependent on C-library version 6. Therefore, by customizing the intrusion detection and prevention rules to the container 162 and the application in the container 162, the system may be able to efficiently address the potential security vulnerabilities specific to the container 162.

In an example, the image scanner 230 may scan a second image 264 of a second container 167 in the container image registry 262. Then, the image scanner 230 may create a second image tag 284 of the second container 167 and create a second set of generic rules 286 for the second container 167. Then, the image scanner 230 may package the second image tag 284 of the second container 167 with the second set of generic rules 286 to form a second tuple 282 and store the second tuple 282 in the application rule registry 270.

Figure 5A:
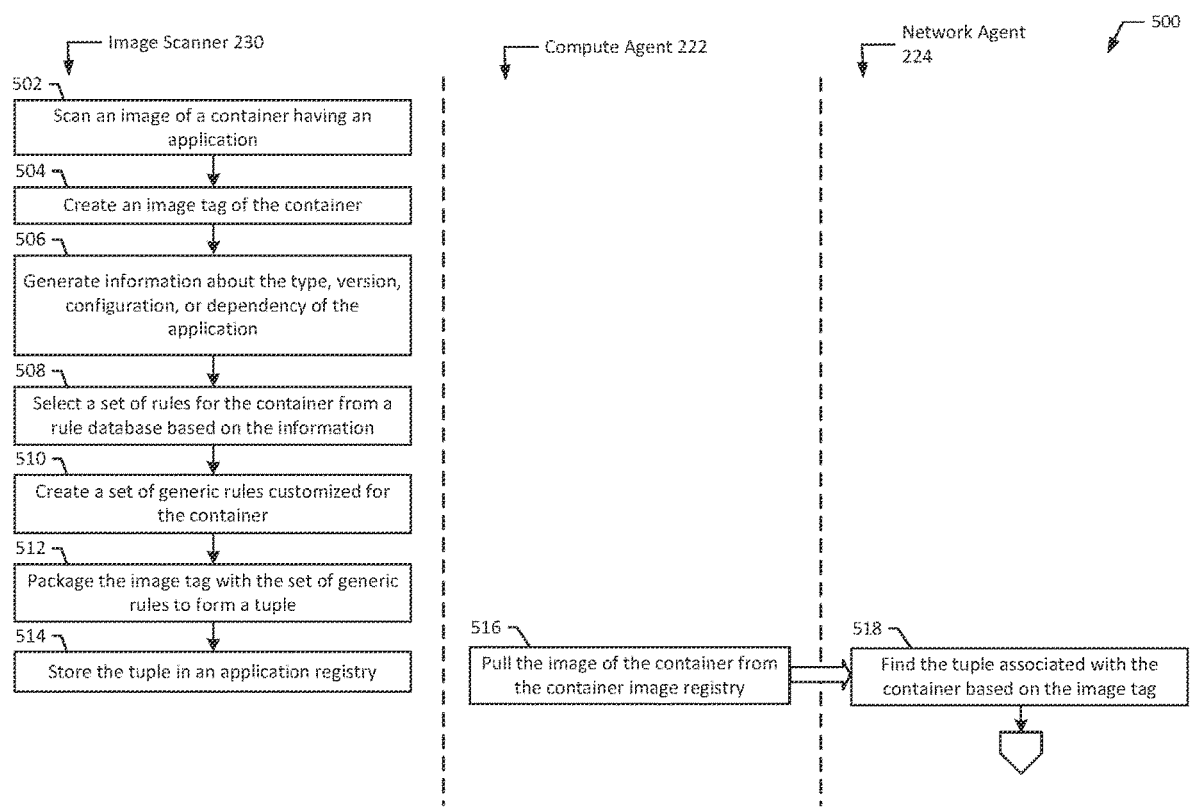
FIGS. 5A, 5B, and 5C are flow diagrams illustrating example processes for providing intrusion detection and prevention for containers according to some examples of the present disclosure.
Figure 5B:
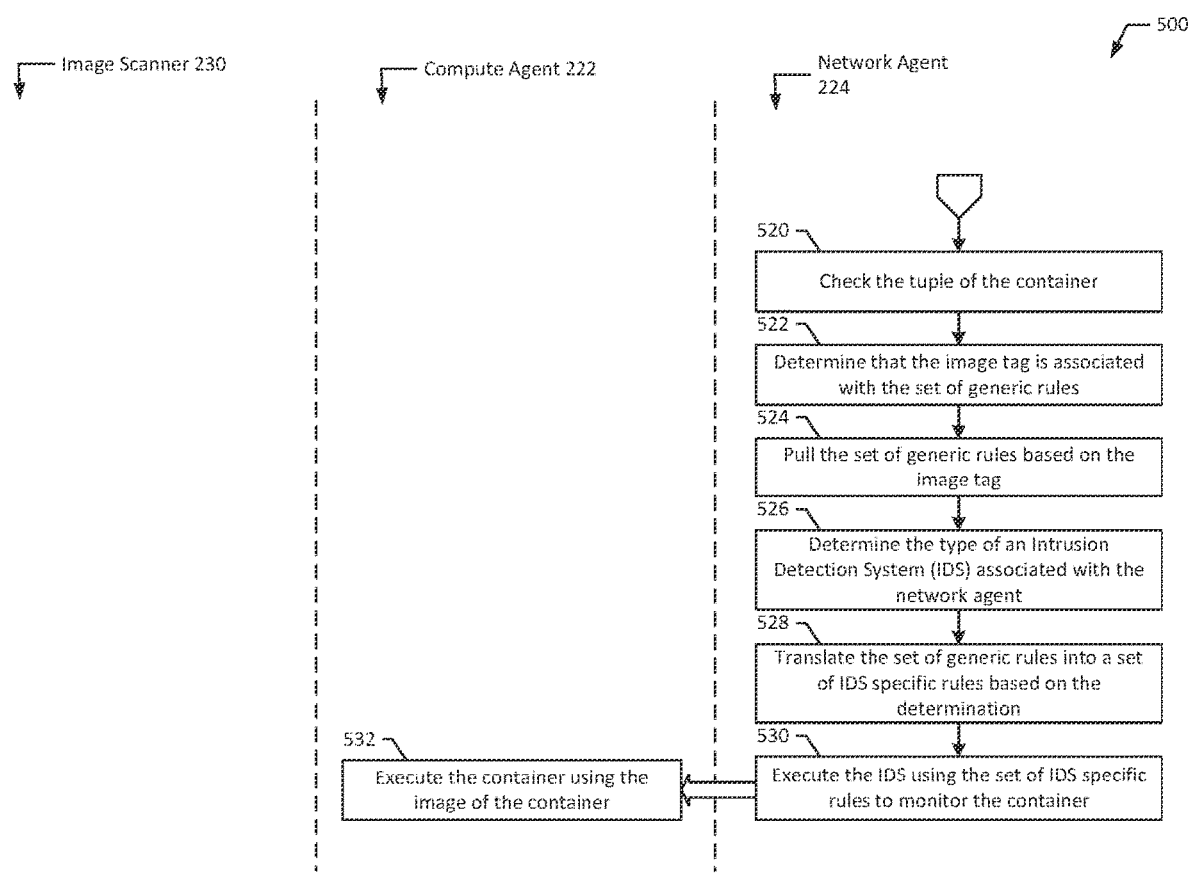
Figure 5C:
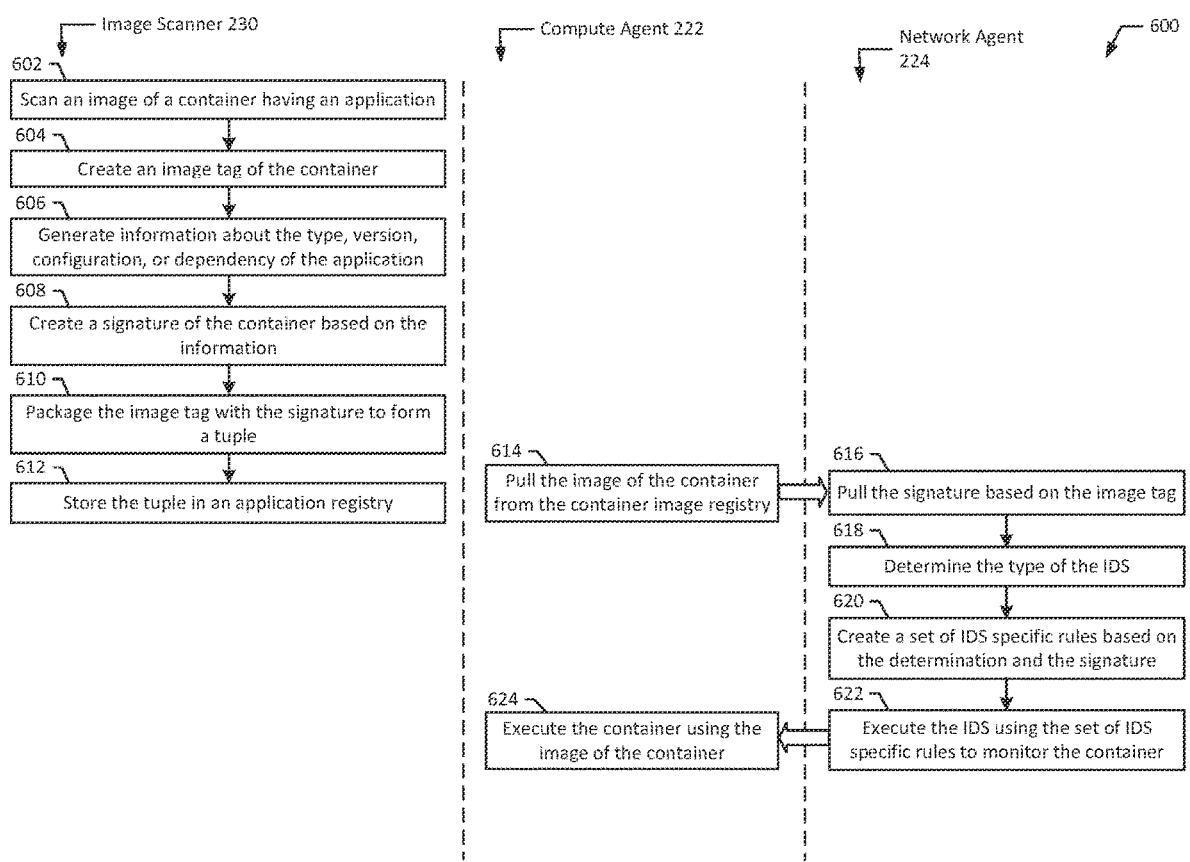

FIGS. 5A, 5B, and 5C illustrate flow diagrams of example methods 500 and 600 for providing intrusion detection and prevention for containers according to some examples of the present disclosure. Although the example methods 500 and 600 are described with reference to the flow diagrams illustrated in FIGS. 5A, 5B, and 5C, it will be appreciated that many other methods of performing the acts associated with the method may be used. For example, the order of some of the blocks may be changed, certain blocks may be combined with other blocks, and some of the blocks described are optional. The methods 500 and 600 may be performed by processing logic that may include hardware (circuitry, dedicated logic, etc.), software, or a combination of both. For example, the methods 500 and 600 may be performed by a system including an image scanner 230, a compute agent 222, and a network agent 224 communicating or interacting with each other.

In the illustrated example, an image scanner 230 may scan an image 262 of a container 152 having an application (block 502). The image scanner 230 may create an image tag 274 of the container 152 (block 504) and generate information about the type, version, configuration, or dependency of the application (block 506). The image scanner 230 may select a set of rules for the container 152 from a rule database 240 based on the information (block 508). The image scanner 230 may, based on the information, create a set of generic rules 276 customized for the container 152 (block 510). In an example, the set of generic rules 276 created by the image scanner 230 may be the set of rules selected from the rule database 240 with no modification of the selected rules. In another example, the set of rules selected from the rule database 240 may be further modified to create the set of generic rules 276. The set of rules from the database 240 or the set of generic rules 276 may be translatable for use with different types of IDSs. The image scanner 230 may package the image tag 274 with the set of generic rules 276 to form a tuple 272 (block 512) and store the tuple 272 in an application registry 270 (block 514).

At a later time, a compute agent 222 may pull the image 262 of the container 152 from the container image registry 260 (block 516). For example, the compute agent 222 may pull the image 262 of the container 152 from the container image registry 260 to start executing/deploying the container 152. Then, a network agent 224 may find the tuple 272 associated with the container 152 based on the image tag 274 (block 518). The network agent 224 may check the tuple 272 of the container 152 (block 520) and determine that the image tag 274 is associated with the set of generic rules 276 (block 522). Then, the network agent 224 may pull the set of generic rules 276 based on the image tag 274 (block 524).

The network agent 224 may determine the type of an IDS 226 associated with the network agent 224 (block 526). The network agent 224 may translate the set of generic rules 276 into a set of IDS specific rules based on the determination of the type of the IDS 226 (block 528). In an example, the translation/conversion of the set of generic rules to IDS specific rules may be done by another component in the system. For example, a separate rule converter or translator may be provided either in the container system 210 or outside of the container system 210 to pull and translate the generic rules, and send the translated rules to the network agent 224 or the IDS 226. In an example, the network agent 224 may execute the IDS 226 using the set of IDS specific rules to monitor the container 152 to detect a malicious attack (block 530). Then, the compute agent 222 may execute the container 152 using the image 262 of the container 152 (block 532).

In an example, the network agent 224 may perform the steps described at blocks 518-530 before the container 152 starts executing or being deployed as illustrated in FIG. 5B. In another example, the network agent 224 may pre-check the container 152 by performing some or all of the steps described at blocks 518-530 before the compute agent 222 pulls the image of the container from the container image registry at block 516. In another example, the network agent 224 may perform some or all of the steps described at blocks 518-530 when or after the container 152 starts executing.

Turning to the method 600 shown in FIG. 5C, in an example, an image scanner 230 may scan an image 262 of a container 152 having an application (block 602). Then, the image scanner 230 may create an image tag 312 of the container 152 (block 604) and generate information about the type, version, configuration, or dependency of the application (block 606). Then, the image scanner 230 may create a signature 314 of the container 152 based on the information (block 608). Then, the image scanner 230 may package the image tag 312 with the signature 314 to form a tuple 310 (block 610) and store the tuple 310 in an application registry 300 (block 612).

At a later time, a compute agent 222 may pull the image 262 of the container 152 from the container image registry 260 (block 614). For example, the compute agent 222 may pull the image 262 of the container 152 from the container image registry 260 to start executing/deploying the container 152. Then, a network agent 224 may find the tuple 310 associated with the container 152 based on the image tag 312. The network agent 224 may check the tuple 310 of the container 152 and determine that the image tag 312 is associated with the signature 314. The network agent 224 may pull the signature 314 based on the image tag 312 (block 616).

Then, the network agent 224 may determine the type of an IDS 226 associated with the network agent 224 (block 618). The network agent 224 may create a set of IDS specific rules based on the determination of the type of the IDS 226 and the signature 314 (block 620). For example, the network agent 224 may translate the signature 314 to the set of IDS specific rules. Then, the network agent 224 may execute the IDS 226 using the set of IDS specific rules to monitor the container 152 (block 622). Then, the compute agent 222 may execute the container 152 using the image 262 of the container 152 (block 624). In an example, the network agent 224 may perform the steps described at blocks 616-622 before the container 152 starts executing or being deployed as illustrated in FIG. 5C. In another example, the network agent 224 may pre-check the container 152 by performing some or all of the steps described at blocks 616-622 before the compute agent 222 pulls the image of the container from the container image registry at block 614. In another example, the network agent 224 may perform some or all of the steps described at blocks 616-622 when or after the container 152 starts executing.

Figure 6:
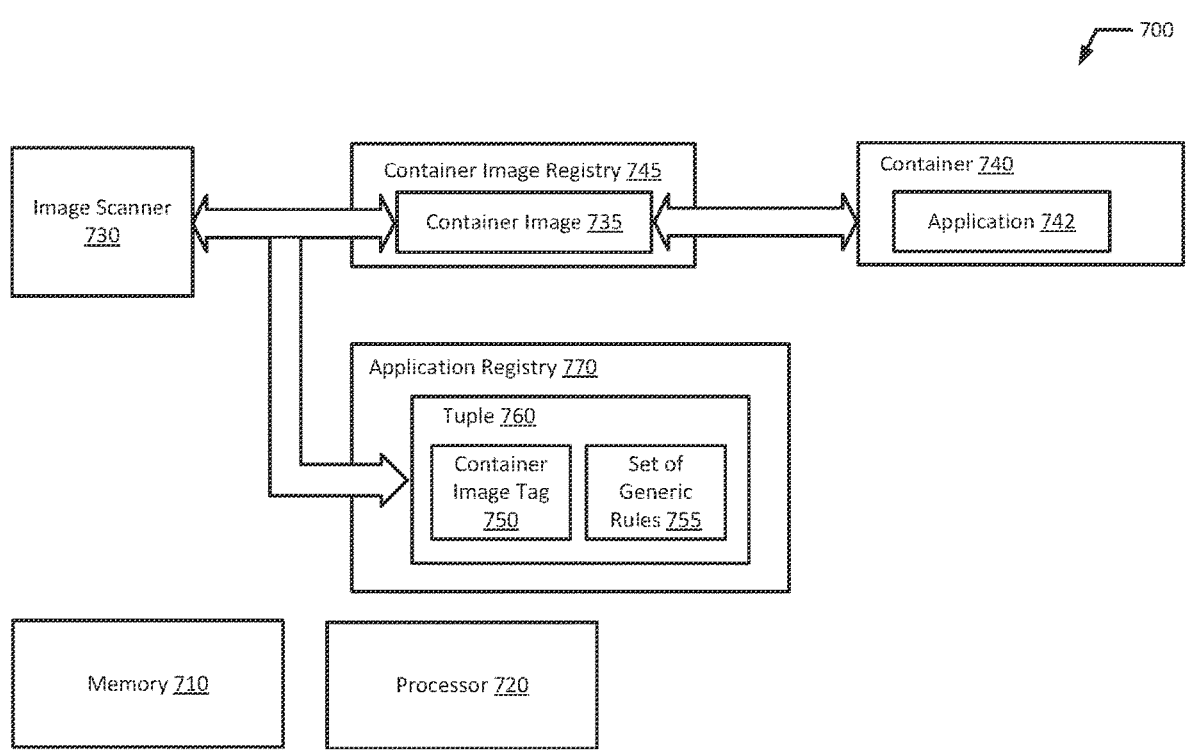
FIG. 6 is a block diagram of an example computer system according to an example of the present disclosure.

FIG. 6 shows a block diagram of an example system according to an example of the present disclosure. As illustrated in FIG. 6, an example system 700 includes a memory 710, a physical processor 720 in communication with the memory 710, and an image scanner 730 executing on the physical processor 720. The image scanner 730 is configured to scan an image 735 of a container 740 in a container image registry 745. The container 740 includes an application 742. The image scanner 730 is also configured to create an image tag 750 of the container 740 and a set of generic rules 755 for the container 740. The image scanner 730 is further configured to package the image tag 750 of the container 740 with the set of generic rules 755 to form a tuple 760 and store the tuple 760 in an application rule registry 770. Accordingly, the presently disclosed system may enable the optimal use of IDS in a container system by creating intrusion detection and prevention rules (e.g., generic rules 276, 286) or signatures customized to the containers using application information, which may advantageously provide a more robust security protection for the container system.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

The terminology used herein is intended to describe particular embodiments only and is not intended to be limiting of the present disclosure. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   scanning, by a scanner, a first container, wherein the first container includes a first application;
   creating, by the scanner, a first tag of the first container;
   creating, by the scanner, a first set of generic rules for the first container;
   packaging, by the scanner, the first tag of the first container with the first set of generic rules to form a first tuple; and
   storing, by the scanner, the first tuple in an application rule registry.

2. The method of claim 1, wherein the first set of generic rules are customized for the first container.

3. The method of claim 1, further comprising:
   scanning, by the scanner, a second container, wherein the second container includes a second application;
   creating, by the scanner, a second tag of the second container;
   creating, by the scanner, a second set of generic rules for the second container;
   packaging, by the scanner, the second tag of the second container with the second set of generic rules to form a second tuple; and
   storing, by the scanner, the second tuple in the application rule registry.

4. The method of claim 3, wherein the second set of generic rules are customized for the second container.

5. The method of claim 1, further comprising, in response to the scanning, generating, by the scanner, information about at least one of a type of the first application, a version of the first application, a configuration of the first application, and a dependency of the first application.

6. The method of claim 5, wherein the scanner creates the first set of generic rules based on the information.

7. The method of claim 5, wherein the type of the first application comprises a database server, a web-server, and a JAVA application.

8. The method of claim 6, wherein the scanner creates the first set of generic rules by selecting, based on the information, a set of rules for the first container from a rule database, wherein the set of rules are translatable for use with a plurality of different intrusion detection systems.

9. The method of claim 1, further comprising:
   checking, by a network agent in a container system, the first tuple of the first container in the application rule registry;
   determining, by the network agent, that the first tag of the first container is associated with the first set of generic rules; and
   pulling, by the network agent, the first set of generic rules based on the first tag.

10. The method of claim 9, further comprising:
    determining, by the network agent, a type of an intrusion detection system (IDS) associated with the network agent;
    in response to the determination, translating, by the network agent, the first set of generic rules into a set of IDS specific rules based on the determination of the type of the IDS; and
    executing, by the network agent, the IDS using the set of IDS specific rules to monitor the first container to detect a malicious attack.

11. The method of claim 8, wherein the network agent translates the first set of generic rules into the set of IDS specific rules when the first container starts executing or after the first container starts executing.

12. The method of claim 1, further comprising:
    creating, by the scanner, a first signature for the first container; and
    packaging, by the scanner, the first signature of the first container in the first tuple.

13. The method of claim 12, further comprising:
    checking, by a network agent in a container system, the first tuple of the first container in the application rule registry;
    determining, by the network agent, that the first tag of the first container is associated with the first signature;
    pulling, by the network agent, the first signature based on the first tag; and
    creating, by the network agent, a set of intrusion detection system (IDS) specific rules based on the first signature.

14. The method of claim 12, wherein the first signature is created using a hash function.

15. The method of claim 14, wherein the hash function uses information about at least one of a type of the first application, a version of the first application, a configuration of the first application, and a dependency of the first application as an input to the hash function.

16. The method of claim 12, wherein the first signature comprises an encrypted message.

17. The method of claim 1, wherein the first application is a microservice.

18. A system comprising:
a memory;
a physical processor in communication with the memory; and
a scanner executing on the physical processor to:
scan a first container, wherein the first container includes a first application;
create a first tag of the first container;
create a first set of generic rules for the first container;
package the first tag of the first container with the first set of generic rules to form a first tuple; and
store the first tuple in an application rule registry.

19. The system of claim 18, wherein in response to the scanning the scanner generates information about at least one of a type of the first application, a version of the first application, a configuration of the first application, and a dependency of the first application, wherein the scanner creates the first set of generic rules by selecting, based on the information, a set of rules for the first container from a rule database, wherein the set of rules are translatable for use with a plurality of different intrusion detection systems.

20. A non-transitory machine readable medium storing instructions, which when executed by one or more processors in a computer system, cause the computer system to perform a method comprising:
scanning, by a scanner, a first container, wherein the first container includes a first application;
creating, by the scanner, a first tag of the first container;
creating, by the scanner, a first set of generic rules for the first container;
packaging, by the scanner, the first tag of the first container with the first set of generic rules to form a first tuple; and
storing, by the scanner, the first tuple in an application rule registry.

* * * * *